April 29, 1924.

L. H. GREENE

COUPLING FOR DRILL PIPES

Filed Feb. 1, 1922

1,491,986

INVENTOR
LORENZO H. GREENE
BY Hazard & Miller
ATT'YS.

Patented Apr. 29, 1924.

1,491,986

UNITED STATES PATENT OFFICE.

LORENZO H. GREENE, OF LOS ANGELES, CALIFORNIA.

COUPLING FOR DRILL PIPES.

Application filed February 1, 1922. Serial No. 533,224.

*To all whom it may concern:*

Be it known that I, LORENZO H. GREENE, a citizen of the United States, residing at Los Angeles, in the county of Los Angeles and State of California, have invented new and useful Improvements in Couplings for Drill Pipes, of which the following is a specification.

My invention relates to couplings for drill pipes of the character used in hydraulic boring, and a purpose of my invention is the provision of a coupling which is constructed to form an additional or subsidiary waterway or port, and a valve controlling the main and subsidiary water-ways or ports in such manner that the operation of supplying an additional drill pipe section can be readily accomplished without any cessation in the flow of water into the pipe or any reduction in its pressure.

I will describe one form of coupling embodying my invention and will then point out the novel features thereof in claims.

In the accompanying drawings.

Figure 1:
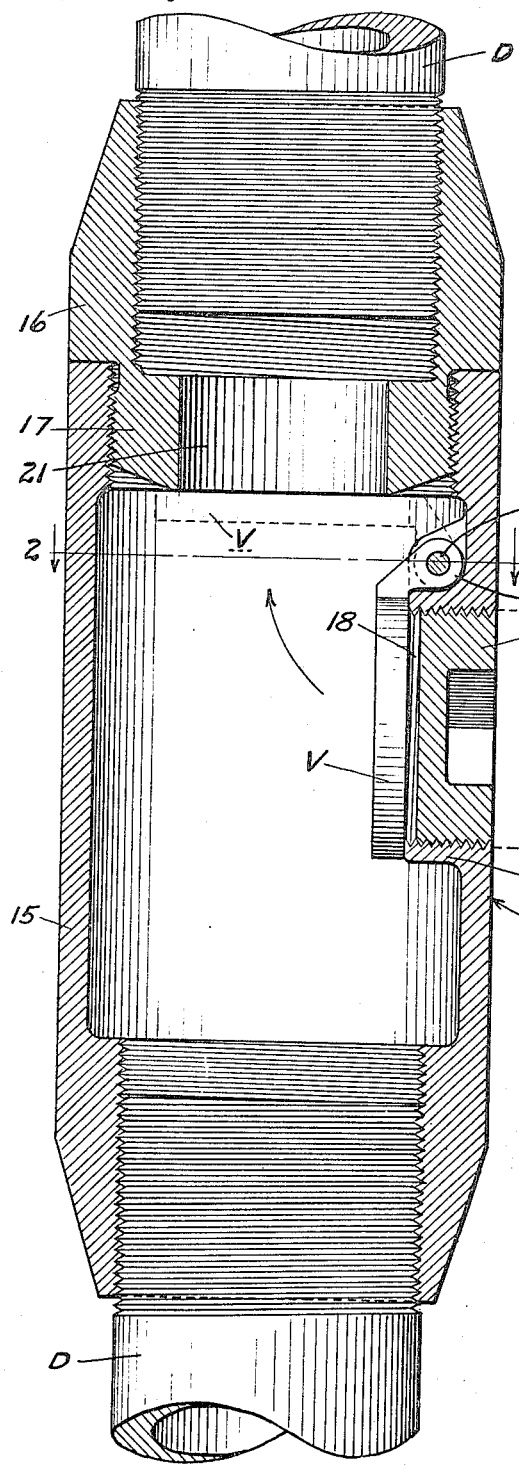
Figure 1 is a view showing in vertical section one form of coupling embodying my invention in applied position between the two sections of a drill pipe.

Referring specifically to the drawings in which similar reference characters refer to similar parts, my invention in its present embodiment comprises a tubular body designated generally at B and including in the present instance a main section 15 and a subsidiary section 16, although it is to be understood that the body may be formed of one piece without departing from the spirit of the invention. The subsidiary section 16 is provided with an offset collar 17 threaded exteriorly to engage the inner wall of the section 15 and shaped in the same manner as the other end of the section 15. The lower ends of the section 15 and the section 16 are screw threaded interiorly to receive the confronting ends of two sections of drill pipe D and to thereby serve as a coupling for connecting the two sections, as will be understood.

The main section 15 is provided at a point between its ends with a water-way or entrance port 18 adapted to be closed by a screw plug 19, with the walls of the port flanged as indicated at 20 to accommodate the plug. The collar 17 is of annular form as clearly shown in Figure 1 and the bore of this collar constitutes an entrance port 21. The lower edge of the collar 17 and the inner edge of the flange 20 constitute valve seats upon either of which is adapted to repose a valve V provided with a pivot ear 22 adapted to fit in the recess 23 formed in a thickened portion 24 of the section B as clearly shown in Figure 2. A pivot pin 25 is extended through suitable openings formed in the thickened portion 24 and the ear 22 for pivotally sustaining the ear and consequently the valve so that the latter can move from the position shown in solid lines in Figure 1 to the position shown in dotted lines.

Figure 2:
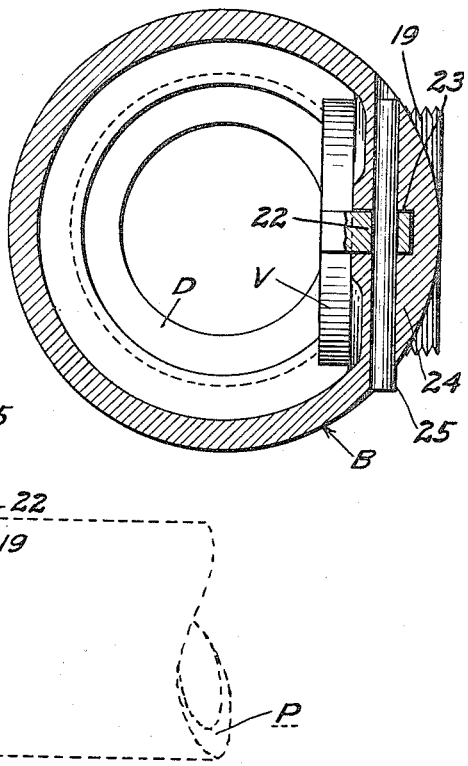
Figure 2 is a transverse sectional view taken on the line 2—2 and looking in the direction of the arrows.

In operation, let it be assumed that the coupling shown in Figure 1 constitute the upper end of a drill pipe to which water is adapted to be supplied from a suitable connection to the upper end of the coupling so that it passes downwardly through the drill pipe in effecting the boring operation. It will be clear that under these conditions the pressure of water operates to maintain the valve V in closing position with respect to the port 18 and in opening position with respect to the port 21. As the boring operation proceeds it is of course necessary to add from time to time additional sections of drill pipe, and when adding a section the plug 19 is removed from the port 18 and a water pipe P shown in dash lines in Figure 1 is inserted within the port 18. The water introduced into the coupling from this pipe naturally swings the valve V to the dotted line position shown in Figure 1 thereby opening the port 18 and closing the port 21. This water passes downwardly through the drill pipe and operates in the same manner to effect a hydraulic boring of the well. As the valve V is now in closing position with respect to the port 21, it will be clear that an additional section of drill pipe can be readily applied to the section 16 and without the necessity of discontinuing the supply of water to the drill pipe. After the pipe section has been added the supply of water again takes place at the top of the coupling, the pipe P being removed and the plug 19 again applied.

Although I have herein shown and described only one form of coupling embodying my invention, it is to be understood that various changes and modifications may be made herein without departing from the spirit of the invention and the spirit and scope of the appended claims.

What I claim is:

1. The combination with sections of pipe forming a drill stem, of a coupling adapted to connect two sections of the drill stem and having a side opening and two internal valve seats at right angles to each other, one in the main line and one for the side opening, the said opening being adapted to receive a water pipe or a plug, a valve mounted in the chamber of the coupling and adapted to close either opening so that when a drill pipe section is to be added the plug may be removed and a water pipe connected until the drill stem goes down to the extent of a section and then the water pipe removed and the plug inserted to allow the coupling to go on down into the well.

2. A coupling adapted to connect two sections of drill pipes and having a side opening and two internal valve seats at right angles to each other, one seat being in the main line and the other being for the side opening, the side opening being adapted to receive a water pipe or a plug, and a valve mounted in the chamber of the coupling and adapted to close either opening.

In testimony whereof I have signed my name to this specification.

LORENZO H. GREENE.